L. A. WESTON.
DEVICE FOR RETAINING JOINT FORMING MATERIAL.
APPLICATION FILED FEB. 29, 1916.
1,237,003.
Patented Aug. 14, 1917.
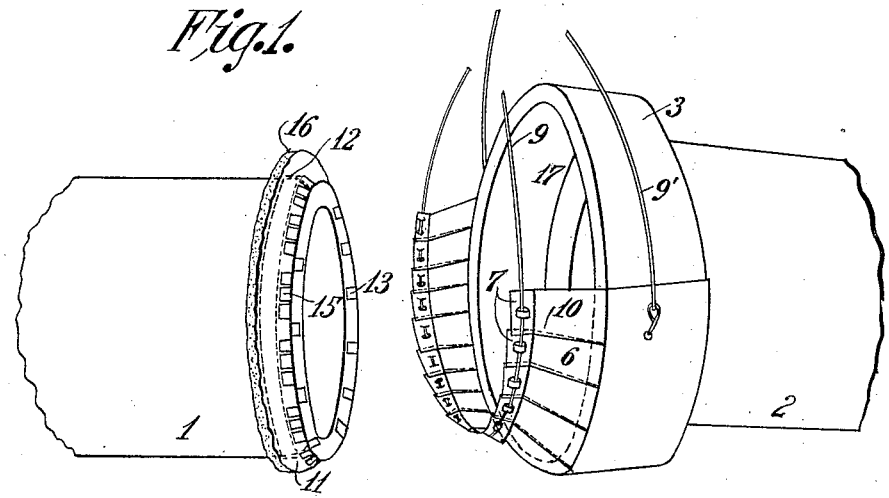
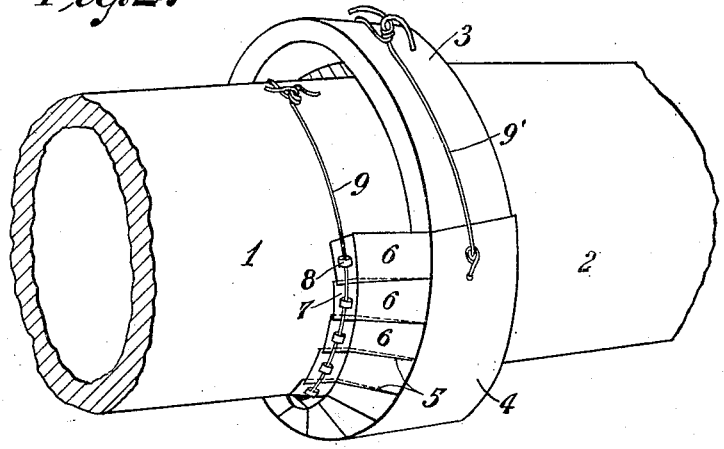
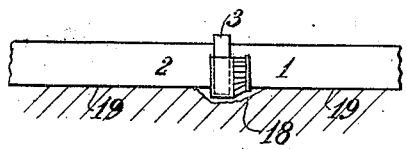
WITNESSES:
F. V. Paige
INVENTOR,
Leroy A. Weston,
BY Harry W. Bowen.
ATTORNEYS.

UNITED STATES PATENT OFFICE.

LEROY A. WESTON, OF ADAMS, MASSACHUSETTS.

DEVICE FOR RETAINING JOINT-FORMING MATERIAL.

1,237,003.  Specification of Letters Patent.  Patented Aug. 14, 1917.

Application filed February 29, 1916. Serial No. 81,117.

*To all whom it may concern:*

Be it known that I, LEROY A. WESTON, a citizen of the United States of America, residing at Adams, in the county of Berkshire and State of Massachusetts, have invented a new and useful Improvement in Devices for Retaining Joint-Forming Material, of which the following is a specification.

The invention relates to improvements in devices for retaining the joint forming material, usually cement, between the ends of tile pipe. Heretofore, it has been found difficult to prevent the cement or other material from flowing into the interior of the pipe during the process of cementing the joint, also, it has been found difficult to insert a sufficient quantity of the cement into the annular space at the lower side of the joint which is formed by means of the usual bell and spigot end of the adjacent pipe sections, or, in other words the annular channel around the spigot end is not uniform when the work is completed. Usually, a much greater space is left at the top than at the bottom part of the joint with the result that not only does the pipe leak but it permits external water to gain access to the interior of the tile by reason of the fact that there is an insufficient quantity of cement on the lower side of the joint in the coupling. The present invention comprises in general a band or semi-circular collar that is inserted below the joint and extends upward to substantially one half the distance or diameter of the pipe, permitting the concrete to be inserted on the upper side, whereby it will flow into the bell end of the pipe. The band is formed with a plurality of elastic fingers that span the opening between the bell and the spigot end of the pipe in order to cause the band to readily accommodate itself to any irregularities on the spigot end of the pipe. Means are also provided for readily attaching the band to both sections of the pipe. The present invention relates to the type of joint coupling device shown and described in my United States Letters Patent No. 1,163,726, Dec. 14, 1915, and an application filed April 29, 1915, Ser. No. 24,801, Patent No. 1,174,209.

Referring to the drawings:

Figure 1 shows the device in assembled position before the spigot end of the pipe is inserted into the bell end of the adjacent section of the pipe, also, showing a device located on the end of the spigot part of the pipe to prevent the cement from flowing into the interior;

Fig. 2 shows the sections of the pipe assembled and ready for the insertion of the cement, also, the attaching wires twisted together for permanently holding the band in place; and Fig. 3 shows the manner in which the pipes in practice are laid, in the trench.

Referring to the drawings in detail: 1 designates the spigot end of the pipe, 2, the bell shaped end the bell proper being indicated at 3. The band comprises a semi-circular continuous portion 4 of suitable material, as sheet iron, the length of which is substantially equal to the bell portion 3. The slitted part of the band that extends toward the spigot end of the pipe is shown at 5. These slits may be any convenient number in order to provide the flexible fingers 6 which extend in an inclined direction across the annular space between the pipe sections. The extreme ends of the fingers are bent so as to lie in a direction parallel with the pipe 1, as indicated at 7. These ends have struck-up portions or clips 8 through which passes a wire or other securing device 9 by means of which the fingers may be drawn tightly against the pipe 1, as shown in Fig. 2. The continuous portion 4 is also secured in place by means of the wires 9', the ends of which extend upward and are twisted together, as shown in Fig. 2 on the upper side of the bell. These elastic fingers, it will be observed, overlap each other, as indicated by the dotted lines 10, whereby a substantially cement tight joint is produced, thus preventing the cement from flowing out between the fingers after the band has been tightly clamped or secured in position.

In order to prevent the cement from flowing into the interior of the pipes a strip of felt 11 is slipped over the end of the pipe 1. This strip of felt is attached to the metal band 12 which band is formed with the inturned fingers 13 that engage the end 14 of the spigot 1. The fingers 15 of the band 12 are crimped over so as to pinch the felt 11 between the body portion of the band 12 and the fingers. This strip of felt serves to form a tight joint between the edge 16 and the inner surface 17 of the bell 3, thereby preventing the cement from gaining access to the interior of the pipe. The construction set forth illustrating the device shown on the part 1 forms no part of this invention, as it has been clearly shown, described, and claimed in my United States Letters Patent No. 1,163,726, Dec. 14, 1915, and the said application filed April 29, 1915, Ser. No. 24,801.

This present invention is confined solely to the construction of the collar for closing the lower side of the joint and for preventing the cement from leaking outward after the same is poured into the collar. This collar is designed to be permanently secured to the bell and spigot part of the adjacent sections. It is made of some inexpensive material as sheet steel or iron and the cost of producing the same is small compared with the great advantages obtained, since it enables a pipe joint to be packed or formed with a large quantity of the cement material at the lower part of the bell. It can be readily and quickly secured in place when the pipe is laid, and, does not require any skilled labor for its operation. It is only necessary to slip the collar around and below the two ends of the pipe after a small recess or opening 18 is dug in the lower part of the trench and immediately below the adjoining ends of the pipe sections clearly shown in Fig. 3. The weight of the pipes does not, therefore, rest directly on this joint but is taken up by the earth between the joints, indicated at 19.

From this description it will be seen that I have produced a very inexpensive and convenient device for retaining the cement within the bell end of a sewer pipe and one that can be readily applied and secured in place, the flexible fingers of which automatically adapt themselves to any external irregularities of the pipe and also the binding wire 9 serves to cause these fingers to tightly and closely engage each other, thus forming a tight joint along the slits or openings 5.

What I claim is:

1. A device of the kind described, comprising a band designed to engage the bell portion of a section of pipe, flexible integral fingers connected to the band portion, and having bent ends extending in a direction substantially parallel to the band portion for engaging the spigot end of an adjacent section of pipe, and separate devices attached to the flexible portions and to the band portion for securing the device in place, as described.

2. A device for attachment to adjacent sections of sewer pipe comprising a substantially semi-circular body part which engages the bell portion of one of the pipe sections, a plurality of flexible overlapping finger-like independently movable elements adapted to conform to external irregularities of the spigot end of the coöperating section of pipe, the extremities of the elements having struck-up portions to form an opening through which a securing device is adapted to be passed, and means for securing the body portion to the bell of the pipe section, said flexible elements serving to retain a sealing element in the annular space between the bell and the spigot end of the pipe, as described.

3. A device for retaining joint forming material of sewer pipes in place comprising a member adapted to be inserted below the joint, said member having a portion to engage the outer surface of the bell and flexible overlapping fingers having free independently movable ends extending from said portion and engaging the spigot end of an adjacent pipe, and means to secure the member in place.

4. A device for retaining the cement when in a semi-liquid state between the bell and spigot ends of a sewer pipe and comprising in combination a band of thin flexible metal, semi-circular in form for engaging the lower side of the bell of a sewer pipe section and having a plurality of finger-like overlapping members integrally connected at one edge of the band, and extending from the band toward the spigot end of a pipe section in an inclined direction, said finger-like members having struck-up portions to receive a wire for securing the finger-like members to the spigot.

LEROY A. WESTON.

Copies of this patent may be obtained for five cents each, by addressing the "Commissioner of Patents, Washington, D. C."